United States Patent
Lei et al.

(10) Patent No.: US 9,246,572 B2
(45) Date of Patent: Jan. 26, 2016

(54) DIVERSITY INDICATING METHOD IN GERAN/MUROS SYSTEMS

(75) Inventors: Haipeng Lei, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 13/129,467

(22) PCT Filed: Nov. 27, 2009

(86) PCT No.: PCT/KR2009/007048
§ 371 (c)(1),
(2), (4) Date: May 16, 2011

(87) PCT Pub. No.: WO2010/062140
PCT Pub. Date: Jun. 3, 2010

(65) Prior Publication Data
US 2011/0222456 A1 Sep. 15, 2011

(30) Foreign Application Priority Data
Nov. 27, 2008 (CN) .......................... 2008 1 0177408

(51) Int. Cl.
*H04B 7/02* (2006.01)
*H04B 7/08* (2006.01)
*H04B 7/06* (2006.01)

(52) U.S. Cl.
CPC ............ *H04B 7/0877* (2013.01); *H04B 7/0665* (2013.01); *H04B 7/0689* (2013.01)

(58) Field of Classification Search
None
See application file for complete search history.

(56) References Cited

U.S. PATENT DOCUMENTS

| | | | | |
|---|---|---|---|---|
| 5,991,282 A * | 11/1999 | Langlet et al. | ................ | 370/332 |
| 6,907,030 B1 * | 6/2005 | Bladsjo et al. | ................ | 370/349 |
| 6,985,434 B2 * | 1/2006 | Wu et al. | ................ | 370/208 |
| 7,058,407 B2 * | 6/2006 | Chi et al. | ................ | 455/449 |
| 8,599,764 B2 * | 12/2013 | Vijayan et al. | ................ | 370/329 |

(Continued)

FOREIGN PATENT DOCUMENTS

| | | |
|---|---|---|
| CN | 101068316 A | 11/2007 |
| CN | 101080939 A | 11/2007 |

(Continued)

OTHER PUBLICATIONS

China Mobile; "Format modification of AGCH and FACCH for TSCs recognition"; 3GPP Draft; 3GPP TSG GERAN, Meeting #39, EF3 IT; Aug. 25-29, 2008; Florence, Italy.

(Continued)

*Primary Examiner* — Robert C Scheibel
(74) *Attorney, Agent, or Firm* — Jefferson IP Law, LLP

(57) ABSTRACT

A diversity indication method in GERAN/MUROS system, includes the steps: after a user receives a diversity indication, it receives data from two sub-channels, and then carries out diversity combination; if the user does not receive diversity indications, users receive data from subchannel allocated to them. Using the method of this invention, we can carry out diversity indications in GERAN/MUROS system. In this way, users do not need to determine whether current frame is using diversity transmission in all sub-channels by carrying out autocorrelated operations over training sequences 26 bit long in each frame, and the users may demodulate information from another paired subchannel only when they receive diversity indications in subchannel allocated regularly to greatly reduce the user's complexity.

10 Claims, 2 Drawing Sheets

(56) References Cited

U.S. PATENT DOCUMENTS

2009/0323588 A1* 12/2009 Aghili et al. .......... 370/328
2010/0048214 A1   2/2010 Usuda et al.

FOREIGN PATENT DOCUMENTS

| CN | 101137210 A    | 3/2008 |
| KR | 10-2002-0027294 A | 4/2002 |
| KR | 10-2008-0030531 A | 4/2008 |

OTHER PUBLICATIONS

Nokia Siemens Networks et al; "Optimized User Diversity Patterns for OSC"; 3GPP Draft; GP-081162; 3GPP TSG GERAN #39; Aug. 25-29, 2008; Florence, Italy.

Marvell; "Higher Order Modulation for MUROS-Updates to TR Text"; 3GPP Draft; GP-081577; 3GPP TSG GERAN #40; Nov. 17-21, 2008; Miami, FL.

* cited by examiner

Legacy

New

←―― 26 frames=120ms ――→
(a)

Legacy

New (b)

DIVERSITY INDICATING METHOD IN GERAN/MUROS SYSTEMS

TECHNICAL FIELD

This invention relates to wireless communication systems, more specifically, to the method to improve transmission reliability by sending diversity in wireless communication systems.

BACKGROUND ART

In recent years, with rapid growth in the demand for mobile voice service, GSM network will enter into a great development. However, limited frequency resources become increasingly difficult to meet the needs during people's calls, especially in densely populated cities. With the aging of existing GSM network equipments, it is more urgent to expand existing GSM network.

Multiple User Reuse One Slot (MUROS) technology is mainly used in 3GPP GSM/EDGE Radio Access Network (GERAN). Study Item stage will be discussed from GERAN#36 meeting, aimed at enhancing user capacity of GSM system, and helping network operators to alleviate the pressure. In Work Item stage, it is called VAMOS (Voice Services over Adaptive Multi-user Channels on One Slot).

MUROS needs to further enhance the voice capacity on the basis of reusing existing network equipments and wireless resources. In feasibility study stage, candidate MUROS solutions mainly focus on two or more users reusing the same time slot on the premise that call quality is not compromised. At present, main consideration is given to improving the system's voice capacity by two times, that two users reuse one slot. What is affected is full-rate and half-rate voice channels, TCH/FS, TCH/HS, TCH/EFS, TCH/AFS, TCH/AHS, and TCH/WFS, as well as associated control channels, such as slow associated control channel (SACCH, including full-rate SACCH/TF and half-rate SACCH/TH, where SACCH described below in this invention also includes full-rate and half-rate) and fast associated control channel (FACCH, including full-rate FACCH/F and half-rate FACCH/H, where FACCH described below in this invention also includes full-rate and half-rate).

Existing MUROS solutions mainly include the following four categories:

1) Co-TCH Program

Downlink: linear combined two-way Gaussian minimum shift keying (GMSK) baseband modulation signals (two-way phase difference Pi/2), are sent out upon RF modulation and power amplification.

Uplink: each mobile station uses GMSK modulation respectively, and adopts different training sequence (TSC), to separate out two-way reusing user signals at base station by joint detection methods.

2) Orthogonal Subchannel (OSC) Program

Downlink: a quadri-phase shift keying (QPSK) is used to transmit two-way user signals.

Uplink: each mobile station uses GMSK modulation respectively, and use different training sequences, to separate two-way reused signals at base station by interference elimination methods.

3) Adaptive Symbol Constellation Mapping (ASC) Program

Downlink: alpha-QPSK program, with phase difference alpha between the same channel and orthogonal channel.

Uplink: each mobile station uses GMSK modulation respectively, and adopts different training sequences, to demodulate two-way reused signal at base station with multi-user-multiple-input multiple-output (MU-MIMO) receivers.

4) High-order Modulation (HOM) Program

Downlink: each user is separately numbered, and GMSK, QPSK, 8PSK, or 16QAM programs can be used upon rate matching to reuse data of 1-4 users in the same time-frequency resources.

Uplink: up to two users share the same time-frequency resources, using GMSK or QPSK modulation, and distinguishing the users through the training sequence.

At present, in feasibility study of MUROS, main consideration is given to the above-mentioned four programs, allowing two users to share the same time-frequency resources to improve the system capacity by two times. However, which program to be used in 3GPP GERAN is still under discussion. No matter whichever program, it can be regarded as there are two sub-channels respectively, allocated to a user, forming a user group, or known as a pair of users.

FIG. 1 shows frame structure of GSM system. GSM system uses Time Division Multiple Access (TDMA), in which each TDMA frame is divided into eight time slots, numbered from 0, 1, . . . , 7, regardless of whether frames or time slots are non-overlapping. Time slot is basic wireless resource unit in GSM system. On the principle of certain time slot distribution, each mobile station in each frame can only sends signals to base station in designated time slots. When it meets timing and synchronization conditions, base station can receive separately signals from each mobile station in each time slot without mixing and interference mutually. Meanwhile, signals sent from base station to multiple mobile stations are arranged in order, and transmitted in scheduled time slot. If only mobile stations receive signals in specified time slots, they will be able to distinguish signals received from combined signals.

FIG. 2 shows MUROS frame structure. In MUROS system, on the same carrier frequency, there are two users reusing the same slot; in the downlink, users are identified through I (In-phase) and Q (Quadrature) phase information, while it may be considered as a physical channel is divided into two sub-channels, respectively allocated to a user. FIG. 2 shows a typical two users reusing, each of which occupies a sub-channel. Of course, two sub-channels may also be allocated to a user at the same time.

In GSM system, discontinuous transmission (DTX) technology is used; when voice codec detects voice interval, it will not send during interval period.

The role of DTX:

1. To use DTX to reduce interference level in the system, and improve the effectiveness of the system.

2. Due to the use of DTX transmitter, total time for transmission is lowered, to reduce power consumption and extend service life of MS battery.

In order to achieve DTX, one has to use voice activity detection (VAD), that once the speech pauses, a reminder is given.

In MUROS downlink, as Legacy user and MUROS users occupy the same time-frequency resources during transmission, such two users are called a pair of users. But when one of Legacy users enters into DTX stage, or ends its calls, or switch to other neighbouring districts, such two users will not be able to maintain the state of pairing, and this user will be converted to non-MUROS state or pending for pairing states.

In this case, at present, a good program is to use diversity transmission technology on remaining MUROS users in this user group, that is remaining users send the same information through downlink subchannels.

FIG. 3 shows frame structure in MUROS system during diversity transmission. As shown in the figure, when one of users come into DTX state, or ends its calls, another user may send the same data in two-way subchannels to improve transmission reliability.

At transmitting end, the advantages of using diversity transmission are as follows:

1) It may improve channel quality, in particular, improve control channel SACCH and FACCH channel conditions. In bad channel conditions, it is essential to improve the reliability of control channel;

2) It may easily transfer into pairing state, only if one of sub-channels is allocated to users that newly access to.

At receiving end, a user will need to receive information from two channels, carry out autocorrelated operations over training sequence that it receive and its training sequence, and determine whether the information from the channel is sent to itself. If one adopts diversity transmission, the users may combine the information from such two channels upon demodulation in order to obtain diversity gain; otherwise, the users only demodulate information from sub-channels allocated to themselves initially, and do not obtain diversity gain at this time.

DISCLOSURE OF INVENTION

Technical Problem

As it can be seen from above processes, with or without diversity transmission, the user needs to receive the data from two sub-channels in each TDMA frame, and carry out autocorrelation on training sequences one by one, and determine whether to adopt diversity transmission, which would no doubt increase the complexity of the user receiver.

Solution to Problem

The purpose of this invention is to provide a diversity indicating method in GERAN/MUROS systems.

To achieve these objectives, a GERAN/MUROS system, the diversity of instruction methods, including steps:

After users receive diversity indications, they will receive data from two sub-channels, and then make diversity combination;

If the users do not receive diversity indications, users may receive data from sub-channels allocated to them.

Advantageous Effects of Invention

By using the method of this invention, we can carry out diversity indications in GERAN/MUROS systems. In this way, users do not need to determine whether current frame is using diversity transmission in all sub-channels by carrying out autocorrelated operations over training sequences 26 bit long in each frame, and the users may demodulate information from another paired subchannel only when they receive diversity indications in subchannel allocated regularly to greatly reduce the user's complexity.

BEST MODE FOR CARRYING OUT THE INVENTION

Figure 1:
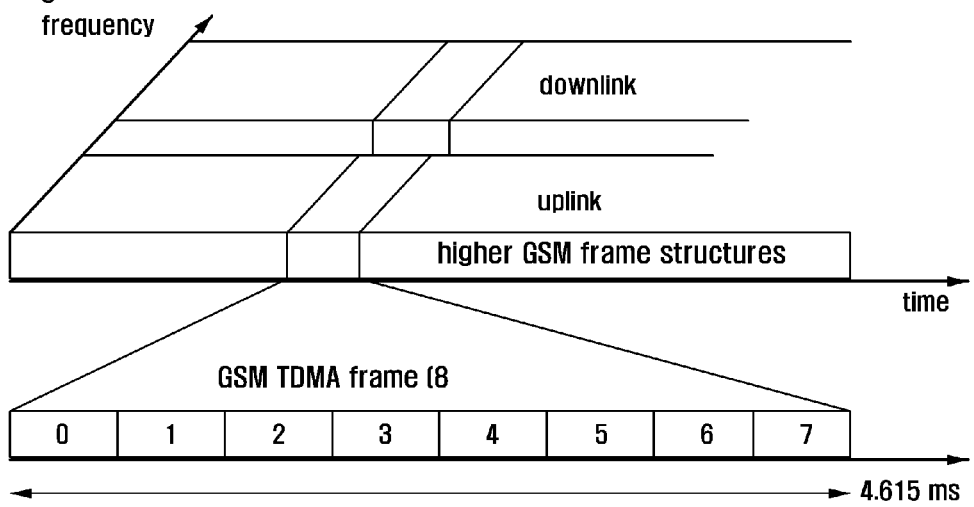
FIG. 1 shows frame structure in GSM system.
Figure 2:
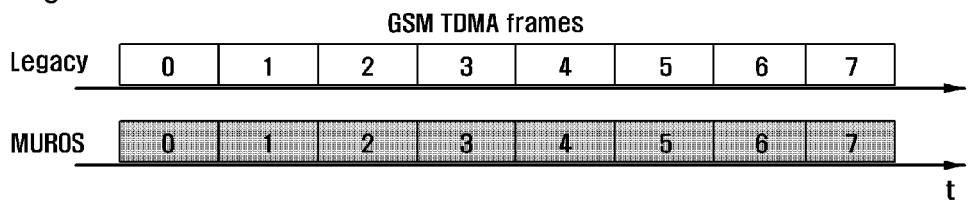
FIG. 2 is a schematic diagram that two users in GERAN/MUROS system reuse the same time-frequency resources.
Figure 3:
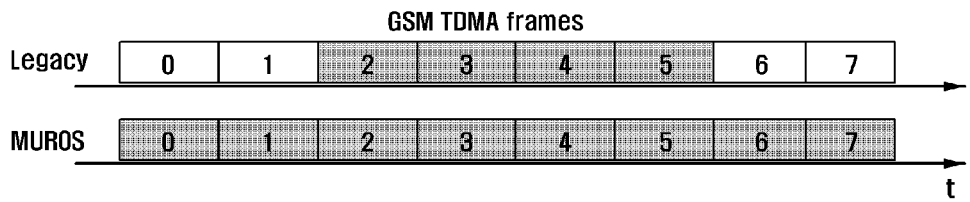
FIG. 3 is a schematic diagram that diversity transmission is used in GERRAN/MUROS system.

This invention defines three data transmission methods from the system to MUROS users: the first method is, in the transmission of data, the system uses training sequences formerly defined traditionally (Old TSC or Legacy TSC), to transmit data in determined subchannel A allocated in several subchannels; the second method is, in the transmission of data, the system uses training sequences newly defined (New TSC or MUROS TSC), to transmit data in determined subchannel B allocated in several subchannels; the third method is, in the transmission of data, the system uses training sequences newly defined (New TSC or MUROS TSC), to transmit data in determined subchannel A allocated in several subchannels. Subchannel allocation method is established by using either regular static or signalling in semi-static or dynamic way. There are two programs for diversity transmission for MUROS users defined in the invention: 1. the first and the second methods are used simultaneously; 2. the second and third methods are used simultaneously. In both programs, for the second program, either the exact same new TSCs are used in data channel transmission or in the program, new TSCs used in the third method different from those used in the second method are used, but pairing relationship between new different TSCs used in these two methods shall be agreed in advance with standard specifications.

Bits at fixed position serve as indicators to indicate diversity transmission adopted in a given frame. This method is applicable to TCH frames, including the steps:

When MUROS downlink is pending for pairing, base station may decide to use diversity transmission, and use bits at fixed positions in TCH frame as indicators. The user receives data from its own sub-channel, as long as you can determine whether current TDMA frame adopts diversity transmission based on this indicator. If we adopt the diversity, then we will demodulate another subchannel data, and combine signals from two subchannels so as to obtain diversity gain. In addition, as MUROS downlink subchannels use the same diversity indication methods, after determining current frame uses diversity transmission, the users may confirm again whether to adopt diversity transmission according to diversity indicators in the other subchannel so as to enhance transmission reliability of diversity indicators. If there is no diversity, then the other subchannel will not be processed.

This method may be used for SACCH frames that in SACCH frames, a number of bits at fixed positions are used to indicate specifically whether to adopt diversity transmission in SACCH frames, in specific steps similar to diversity transmission indication in TCH frames.

This method may be used for FACCH frames that in FACCH frames, a number of bits at fixed positions are used to indicate specifically whether to adopt diversity transmission in FACCH frames, in specific steps similar to diversity transmission indication in TCH frames.

In network layers, signalling is used to indicate diversity transmission. In GSM specification, Channel Description and Channel Description 2 have a domain 5 bits long known as channel type and TDMA offset, where remaining code words can be used to indicate diversity; while Group Channel Description and Group Channel Description 2 have more remaining code words that can be used to indicate diversity, including the steps:

When MUROS downlink is pending for pairing, base station adopts diversity transmission, and sends signalling to users from network layer as indicators. After the users receive the signalling, they may know current TDMA frame is using diversity transmission, and then demodulate the other subchannel data, and combine signals from two subchannels so as to obtain diversity gain; otherwise the other subchannel will not be processed.

DTX message is used as diversity transmission indicator, including the steps:

When MUROS downlink is pending for pairing because a user is under DTX, base station sends messages that should be sent to DTX user to other user in this pair of users. When other user receives SID_FIRST message, it may know current TDMA frame begins to use diversity transmission, then demodulation the other subchannel data, and combine signals from two subchannels so as to obtain diversity gain; when other user receives ON_SET message, it indicates that DTX user starts a new conversation stage, base station will not adopt diversity transmission.

Figure 8:
FIG. 8 is a schematic diagram that MUROS downlink sub-channels are bound with SACCH shift programs where Figure a is a full-rate TCH frame, while Figure b is an half-rate TCH frame.
Figure 8:
Figure 8:
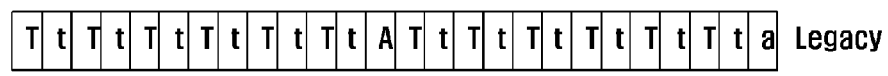
Figure 8:

With programs for binding SACCH shifts in the downlink, SACCHs from sub-channels A (the subchannel used under legacy user state) and B (the subchannel used under MUROS user state) may not appear in the same frame, to avoid the collision between SACCHs. In case of applying such programs, SACCH shift programs may be bound in subchannels, that is in the subchannel applying Legacy TSC, SACCHs emerge in normal frames in order, while the subchannel with New TSC, SACCHs are applied with shift binding transmission programs, where SACCHs are located as shown in FIG. 8. Among shift transmission methods, the method to further improve transmission reliability is that when SACCH frames are transmitted in a subchannel, TCH voice frame in the other corresponding subchannel also transmits information of current SACCH frame while the method in this invention is used to give SACCH frame diversity indicator, allowing user receiving end to receive SACCH data from two subchannels so as to further improve control signalling transmission reliability. Meanwhile, this binding method may also be used for TCH channel, that is, when a user is allocated with legacy TSC, user data will be transmitted in legacy user sub-channels defined in standard specifications; when a user is allocated with new TSC, user data will be transmitted in MUROS user subchannels defined in standard specifications. What to be noted is special binding relationship for TCH channel under diversity transmission state, that under TCH diversity transmission state, two sub-channels (subchannels under Legacy user state and MUROS state) may use New TSC.

Figure 4:
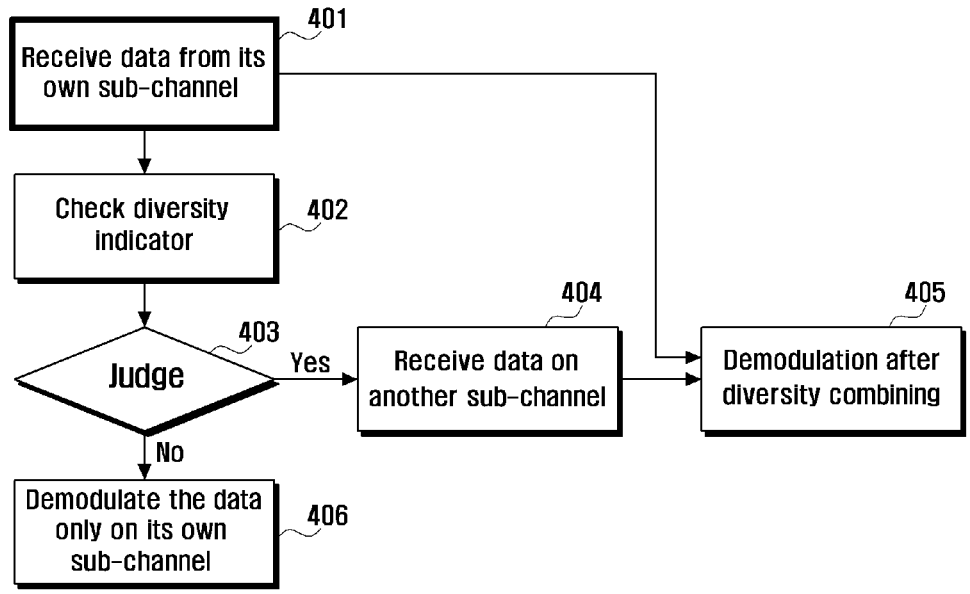
FIG. 4 is a flow diagram that diversity is indicated by using bits at fixed positions.

With the first method, bits at fixed positions are used as indicators to indicate diversity of which processes are as shown in FIG. 4.

This figure is described in detail as follows. As described below, the technology in no connection with the present invention is free from detailed technical description.

401. A user receives data from its own inherent subchannel.
402. A user detects diversity indicators at fixed position of TDMA frame.
403. Determine pursuant to diversity indication mapping table.
404. In case of a diversity, then receive data from the other subchannel paired.
405. A user carries out diversity combination over data from two channels that it receives to obtain diversity gain.
406. If there is no diversity transmission, a user only demodulates data from its own subchannel, but does not process the other subchannel.

Figure 5:
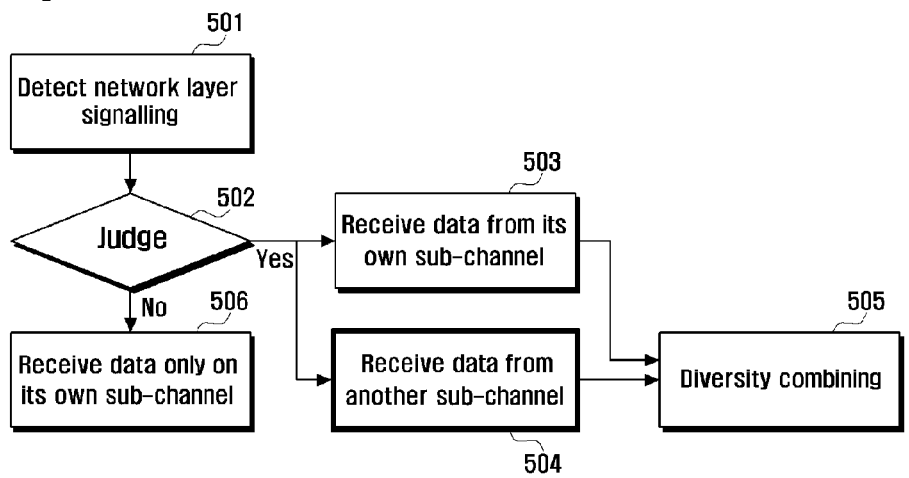
FIG. 5 is a flow diagram that network-layer signalling serves as a diversity indication.

With the second method, in network layer, signalling is used to indicate diversity, of which processes are as shown in FIG. 5.

501. A user receives signalling from network layer through control channel.
502. A user determines whether there is diversity transmission based on received signalling.
503 and 504. If there is diversity transmission, a user receives data from two paired subchannels.
505. A user carries out diversity combination over data from two channels that it receives to obtain diversity gain.
506. If there is no diversity transmission, a user only demodulates data from its own subchannel, but does not process the other subchannel.

Figure 6:
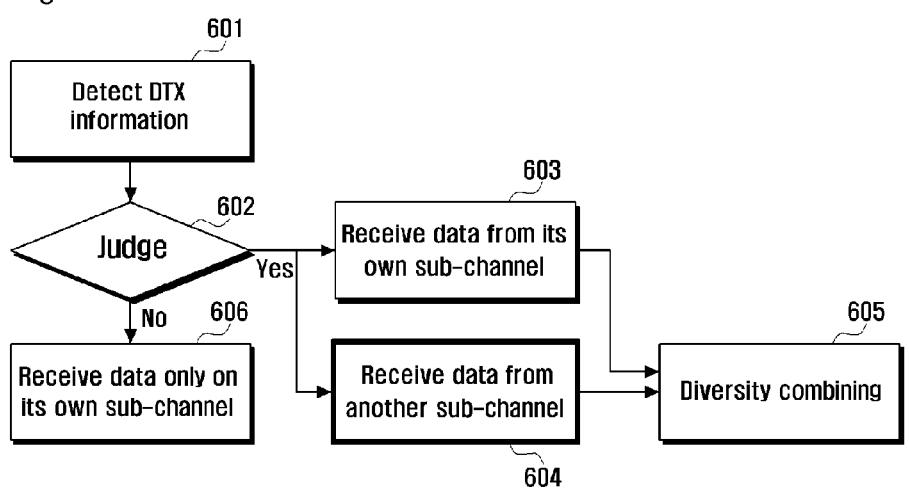
FIG. 6 using DTX information as a diversity of indications flow diagram.

With the third method, DTX message is used as diversity indicator. When MUROS downlink is pending for pairing because one of users is under DTX state, base station sends message of DTX user to other user of this pair of users. The flow in the third method is shown in FIG. 6.

601. A user receives DTX from base station.
602. A user determines whether there is diversity transmission based on DTX information that it receives.
603 and 604. If there is diversity transmission, a user receives data from two paired subchannels.
605. A user carries out diversity combination over data received from two sub-channels to obtain diversity gain.
606. If there is no diversity transmission, a user only demodulates data from its own subchannel, but does not process the other subchannel.

Mode for the Invention

This section gives implementation examples of this invention; in order to avoid too lengthy description for this patent, functions known to the public, or detailed description of equipments are omitted in the following description.

Implementation Example 1

Figure 7:
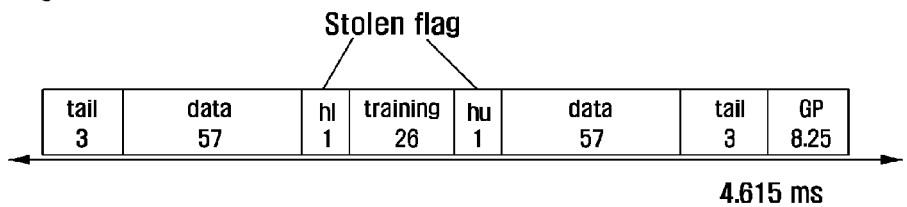
FIG. 7 shows frame structure in which stolen flag in TCH frames serves as a diversity indicator.

Stolen-frame flag in TCH frame is used as diversity indication. As shown in FIG. 7, there is one bit, hl and hu, respectively on both sides of 26 bits long training sequences, two of which are called stolen-frame flags. As 1 20 ms full rate TCH frame and 1 FACCH frame are coded into 456 bit through channel, interleaved into eight bursts, and mapped to 8 consecutive TDMA frames. The specific mapping is shown as follows:

hu=0 means that bits at even positions of first 4 consecutive bursts are TCH voice frames hl=0 means that bits at odd positions of 4 later consecutive bursts are TCH voice frames hu=1 means that bits at even positions of first 4 consecutive bursts are FACCH frames hl=1 means that bits at odd positions of later 4 consecutive bursts are FACCH frames As the information of two bits may mean up to four cases, this implementation example uses S1 and S2 as shown in Table 1 for mapping to indicate whether current frame adopts diversity transmission:

TABLE 1

Two bits Stolen flag mapping relationship table

| S1 | S2 | Mapping relationship |
|---|---|---|
| 0 | 0 | TCH voice frame, without diversity |
| 0 | 1 | TCH voice frame with diversity |
| 1 | 1 | FACCH frame with diversity |
| 1 | 0 | FACCH frame, without diversity |

Thus, when a user receives data from subchannel allocated to itself, detects two bits stolen-frame flag, and determine whether current frame uses diversity transmission according to mapping relationship in Table 1. If there is, it receives data from two sub-channels and then carries out diversity combination; otherwise, it only demodulates data received from its own subchannel.

In addition to those as shown in Table 1, S1 and S2 are made into mapping relationship shown in Tables 2 to 6.

TABLE 2

Two bits Stolen flag mapping relationship table

| S1 | S2 | Mapping relationship |
|---|---|---|
| 0 | 0 | TCH voice frame, without diversity |
| 0 | 1 | TCH voice frame with diversity |
| 1 | 1 | FACCH frame with diversity |
| 1 | 0 | FACCH frame with diversity |

TABLE 3

Two bits Stolen flag mapping relationship table

| S1 | S2 | Mapping relationship |
|---|---|---|
| 0 | 0 | TCH voice frame, without diversity |
| 0 | 1 | TCH voice frame with diversity |
| 1 | 1 | FACCH frame with diversity |
| 1 | 0 | Reserved |

TABLE 4

Two bits Stolen flag mapping relationship table

| S1 | S2 | Mapping relationship |
|---|---|---|
| 0 | 0 | TCH voice frame, without diversity |
| 1 | 1 | FACCH frame with diversity |
| 1 | 0 | Reserved |
| 0 | 1 | Reserved |

TABLE 5

Two bits Stolen flag mapping relationship table

| S1 | S2 | Mapping relationship |
|---|---|---|
| 0 | 0 | TCH voice frame, without diversity |

TABLE 5-continued

Two bits Stolen flag mapping relationship table

| S1 | S2 | Mapping relationship |
|---|---|---|
| 1 | 1 | FACCH frame with diversity |
| 1 | 0 | FACCH frame, without diversity |
| 0 | 1 | Reserved |

TABLE 6

Two bits Stolen flag mapping relationship table

| S1 | S2 | Mapping relationship |
|---|---|---|
| 0 | 0 | TCH voice frame, without diversity |
| 1 | 1 | FACCH frame, with diversity |
| 1 | 0 | Reserved |
| 0 | 1 | FACCH frame, without diversity |

In order to simplify these mapping relationships and improve transmission reliability, diversity transmission may be enforced for FACCH and SACCH specified in standard specification, while TCH voice-frame does not use diversity. In this way, mapping relationship of existing stolen flags is not changed, that 00 indicates TCH voice frame (without diversity transmission), 11 indicates FACCH frame, remaining states 01 and 10 (or use 01 or 10 only) indicate TCH transmission with diversity. In the above tables, the combination of examples described is designed to select appropriate sub-sequence from a collection of sequences to indicate diversity transmission state, and finalize specific sub-sequence(s) as required for specific performance.

Apart from mapping relationship above, stolen flag can also be used to define many types of mapping relationships. In order to avoid too lengthy description in the present invention, such mapping relationships will not be stated here but fall into the scope of protection for this invention.

In addition to TCH frame 2 of the stolen-frame flag bit for diversity of indications, but also can be TCH frame hole, using a number of other fixed location of the diversity of data bits to do the indications.

In the SACCH and FACCH frames, you can place a fixed number of bits used to indicate specifically whether to adopt the diversity of SACCH frame to send.

The same diversity indication method is used in all sub-channels in MUROS downlink, that when in a subchannel, bits at fixed positions are used for diversity indication, while in the other paired subchannel, the same method is also used for diversity indication, so as to improve indicator reliability. When physical channel is sufficient to ensure that the indicator can be correctly received, diversity indicators in the other paired subchannel may be used for other purposes to enhance the flexibility of the system, or transmit data bits so as to improve the system throughput.

The basic idea of this invention is to use bits at fixed positions in TCH, SACCH and FACCH frames as diversity indications, with flexible application depending on system configuration all of which fall into the scope of protection of this method.

Implementation Example 2

Network layer signalling is used to indicate diversity. Compared with physical layer, network layer signalling is more reliable. In GSM specification, Channel Description and Channel Description 2 have a domain 5 bits long known as channel type and TDMA offset, where remaining bits can be used to indicate diversity; while Group Channel Description and the Group Channel Description 2 have more remaining code words to be used to indicate diversity.

In code words of Channel Description channel type and TDMA offset domains, bit mapping relationship is as follows:
Bits
8 7 6 5 4
0 0 0 0 1 TCH/F+ACCHs
0 0 0 1 T TCH/H+ACCHs
0 0 1 T T SDCCH/4+SACCH/C4 or CBCH (SDCCH/4)
0 1 T T T SDCCH/8+SACCH/C8 or CBCH (SDCCH/8)

Where, T is a binary bit with value 0 or 1, and represents the marking of subchannel (where this subchannel is not defined as for users under MUROS state but related to TCH/H or SDCCH subchannels related definitions) corresponding to this channel of the label.

It is observed that the 8th bit is idle, with value 0. Therefore, the 8th bit may be used for diversity indication. S represents the value of the 8th bit, as indicated as follows:
Bits
8 7 6 5 4
S 0 0 0 1 TCH/F+ACCHs
S 0 0 1 T TCH/H+ACCHs
S 0 1 T T SDCCH/4+SACCH/C4 or CBCH (SDCCH/4)
S 1 T T T SDCCH/8+SACCH/C8 or CBCH (SDCCH/8)

Where, S is defined specifically as follows:
S
0 transmission without diversity
1 transmission with diversity Other methods for diversity indication by using idle bits in this domain fall into within the scope of protection of this invention.

In code words in Channel Description 2, in consideration of multiple time slots, code words are designed in a more complex way. As shown from analysis on channel type and TDMA offset domains, there still are four code words left, namely:
Bits
8 7 6 5 4
1 1 0 0 0
1 1 1 0 0
1 1 1 0 1
1 1 1 1 1

So, it is defined as follows:
Bits
8 7 6 5 4
1 1 0 0 0 TCH/F+ACCHs with diversity.
1 1 1 0 T TCH/H+ACCHs with diversity Where, T is a binary bit with value 0 or 1, and represents markings of TCH/H sub-channels.

Other methods for diversity indication by using idle bits in this domain fall into within the scope of protection of this invention.

For Group Channel Description and Group Channel Description 2, they have more remaining code words to be used to indicate diversity. Therefore, mapping relationship for diversity indication may be defined flexibly.

In code words of Group Channel Description and Group Channel Description 2, 5 bits long channel type and TDMA offset domains are defined in the same way as follows:
Bits
8 7 6 5 4
0 0 0 0 1 TCH/FS+ACCHs (speech codec version 1)
0 0 0 1 T TCH/HS+ACCHs (speech codec version 1)
0 0 0 TCH/FS+ACCHs (speech codec version 2)
1 0 0 0 1 TCH/AFS+ACCHs (speech codec version 3)
0 1 T TCH/AFS+ACCHs (speech codec version 3)
0 0 1 T T SDCCH/4+SACCH/C4
0 1 T T T SDCCH/8+SACCH/C8

Where, T is a binary bit with value 0 or 1, and represents the marking of subchannels corresponding to this channel.

It is observed that, there are still several code words idle in 5 bits long domain, which may adopt diversity transmission through voice channels corresponding to mapping relationship as follows.
Bits
8 7 6 5 4
0 0 0 0 0 TCH/FS+ACCHs (speech codec version 1) with diversity
1 0 T TCH/HS+ACCHs (speech codec version 1) with diversity
1 1 0 TCH/FS+ACCHs (speech codec version 2) with diversity
1 1 1 TCH/AFS+ACCHs (speech codec version 3) with diversity
1 1 0 0 T TCH/AFS+ACCHs (speech codec version 3) with diversity
1 1 0 1 0 Reserved
1 1 0 1 1 Reserved
1 1 1 0 0 Reserved
1 1 1 0 1 Reserved
1 1 1 1 0 Reserved
1 1 1 1 1 Reserved The basic idea of this invention is to use remaining code word in network-layer signalling channel type and TDMA offset domains for diversity indications, flexibly defined depending on the system configuration, where other mapping methods fall into within the scope of protection for this invention.

Implementation Example 3

DTX message is applied as diversity indication. When MUROS downlink is pending for pairing because one of users is under DTX state, base station will sent message that should be sent to DTX user to remaining activated user out of this pair of users.

When activated user receives SID_FIRST information from the other user sent from base station, it indicates that base station adopts diversity transmission, and the user also receives data from both subchannels, and then carries out diversity combination to obtain diversity gain.

When the user receives ON_SET information, it shows new voice frame is about to begin, and the user will only receive data from its own subchannel but not process those from the other subchannel.

INDUSTRIAL APPLICABILITY

The basic idea of this invention is to use DTX information as diversity indication, flexibly defined as the case may be, and other methods defined fall into the scope of protection for this invention.

The invention claimed is:
1. A method for diversity transmission of User Equipment (UE) in a GSM/EDGE Radio Access Network (GERAN) system, the method comprising:
receiving data via a first sub-channel of a base station, the first sub-channel being paired with a second sub-channel allocated for another UE;

identifying whether a diversity indication is received from the base station, the diversity indication being included in a network layer signaling message;

if the diversity indication is received, receiving data via the first sub-channel and the second sub-channel on a same time slot and performing diversity combination; and if the diversity indication is not received, receiving data via the first sub-channel, wherein the diversity indication is included in 8-bit field information of the network layer signaling message, and wherein at least 5-bits among the 8-bit field information include 11000.

2. The method of claim 1, wherein the diversity transmission is used in a Multi User Reuse One Slot (MUROS) system of the GERAN system, and wherein the paired sub-channels comprises two sub-channels and each of the sub-channels occupy same time resource and frequency resource.

3. The method of claim 1, wherein the performing of the diversity combination comprises:

demodulating data received via the two paired sub-channels; and combining signals via the two paired sub-channels for obtaining diversity gain.

4. An apparatus of User Equipment (UE) for diversity transmission in a GSM/EDGE Radio Access Network (GERAN) system, the apparatus comprising:

a transceiver configured to communicate other network node; and a controller configured to receive data via a first sub-channel of a base station, the first sub-channel being paired with a second sub-channel allocated for another UE, to identify whether a diversity indication is received from the base station, the diversity indication being included in a network layer signaling message, if the diversity indication is received, to receive data via the first sub-channel and the second sub-channel on a same time slot and to perform diversity combination, and if the diversity indication is not received, to receive data via the first sub-channel, wherein the diversity indication is included in 8-bit field information of the network layer signaling message, and wherein at least 5-bits among the 8-bit field information include 11000.

5. The apparatus of claim 4, wherein the diversity transmission is used in a Multi User Reuse One Slot (MUROS) system of the GERAN system, and wherein the paired sub-channels comprises two sub-channels and each of the sub-channels occupy same time resource and frequency resource.

6. The apparatus of claim 4, wherein the controller is further configured to demodulate data received via the two paired sub-channels, and to combine signals via the two paired sub-channels for obtaining diversity gain.

7. A method for transmitting diversity indication of a base station in a GSM/EDGE Radio Access Network (GERAN) system, the method comprising:

transmitting data to a user equipment (UE) via a first sub-channel of the base station;

transmitting another data to another UE via a second sub-channel of the base station, the first sub-channel being paired with the second sub-channel;

determining whether the UE adopts a diversity transmission via the first sub-channel and the second sub-channel on a same time slot;

if the UE adopts the diversity transmission, generating a diversity indication;

transmitting the generated diversity indication to the UE, the diversity indication being included in a network layer signaling message; and transmitting data to the UE via the first sub-channel and the second sub-channel on the same time slot, wherein the diversity indication is included in 8-bit field information of the network layer signaling message, and wherein at least 5-bits among the 8-bit field information include 11000.

8. The method of claim 7, further comprising:

if the UE does not adopt diversity transmission, transmitting a data to the UE using the first sub-channel allocated.

9. An apparatus of a base station for transmitting diversity indication in a GSM/EDGE Radio Access Network (GERAN) system, the method comprising:

a transceiver configured to communicate other network node; and a controller configured to control to transmit data to a user equipment (UE) via a first sub-channel of the base station, to transmit another data to another UE via a second sub-channel of the base station, the first sub-channel being paired with the second sub-channel, to determine whether the UE adopts a diversity transmission via the first sub-channel and the second sub-channel on a same time slot, if the UE adopts the diversity transmission, to generate a diversity indication, to transmit the generated diversity indication to the UE, the diversity indication being included in a network layer signaling message, and to transmit data to the UE via the first sub-channel and the second sub-channel on the same time slot, wherein the diversity indication is included in 8-bit field information of the network layer signaling message, and wherein at least 5-bits among the 8-bit field information include 11000.

10. The method of claim 9, wherein the controller is further configured, if the UE does not adopt diversity transmission, to transmit a data to the UE using the first sub-channel allocated.

* * * * *